EASY SERVICE TV SET

Filed July 20, 1956 2 Sheets-Sheet 1

INVENTOR.

Stephen Bauman

BY Victor J. Evans & Co.

ATTORNEYS

Aug. 4, 1959 S. BAUMAN 2,898,585

EASY SERVICE TV SET

Filed July 20, 1956 2 Sheets-Sheet 2

INVENTOR.
Stephen Bauman

BY Victor J. Evans & Co.

ATTORNEYS

United States Patent Office 2,898,585

Patented Aug. 4, 1959

2,898,585

EASY SERVICE TV SET

Stephen Bauman, Hasbrouck Heights, N.J.

Application July 20, 1956, Serial No. 599,220

1 Claim. (Cl. 340—367)

This invention relates to television cabinets of the type including separate units, such as one unit for the cathode ray or picture tube and the mounting thereof and another unit for the component parts of the circuit, and in particular a cabinet having a picture tube tray slidably mounted therein and a chassis mounting tray also slidably mounted therein and wherein rows of jacks and plugs are positioned in meshing relation making it possible to withdraw either the picture tube unit or the chassis from the cabinet for servicing.

The purpose of this invention is to facilitate servicing of television sets by making it possible to withdraw the tube or chassis including the component parts of the circuit independently whereby the parts of either unit are readily accessible.

In the conventional television cabinet the tubes, condensers, and other elements are in substantially inaccessible positions and the parts are connected so that only an expert can remove and replace a tube or other parts. The average layman is at the mercy of the television service company or of an individual as the average owner is not familiar with the names of the tubes or of the location of the parts in the set. With this thought in mind this invention contemplates installing the component parts of a television circuit in a tray slidably mounted in a cabinet whereby the tray may readily be withdrawn to provide access to the parts and also mounting the tubes in another tray so that the cathode ray or picture tube may also be withdrawn for servicing.

The object of this invention is, therefore, to provide an improved television cabinet in which the parts of the receiver are mounted in removable trays whereby the parts are readily accessible.

Another object of the invention is to provide a television receiver in which a tray in which the component parts of the set are installed may be removed independently and carried to a servicing shop for repairs.

A further object of the invention is to provide a television cabinet in which the component parts are incorporated in individual trays in which the set is of a comparatively simple and economical construction.

With these and other objects and advantages in view the invention embodies a substantially rectangular-shaped cabinet having a picture tube carrying tray slidably mounted in the upper part and a tray in which the component parts of the chassis are positioned and slidably mounted in the intermediate part of the cabinet and having elements positioned to mesh or coact with elements of the picture tray for completing circuits to the cathode ray or picture tube.

Other features and advantages of the invention will appear from the following description taken in connection with the drawings, wherein.

Figures 1, 2, 3:
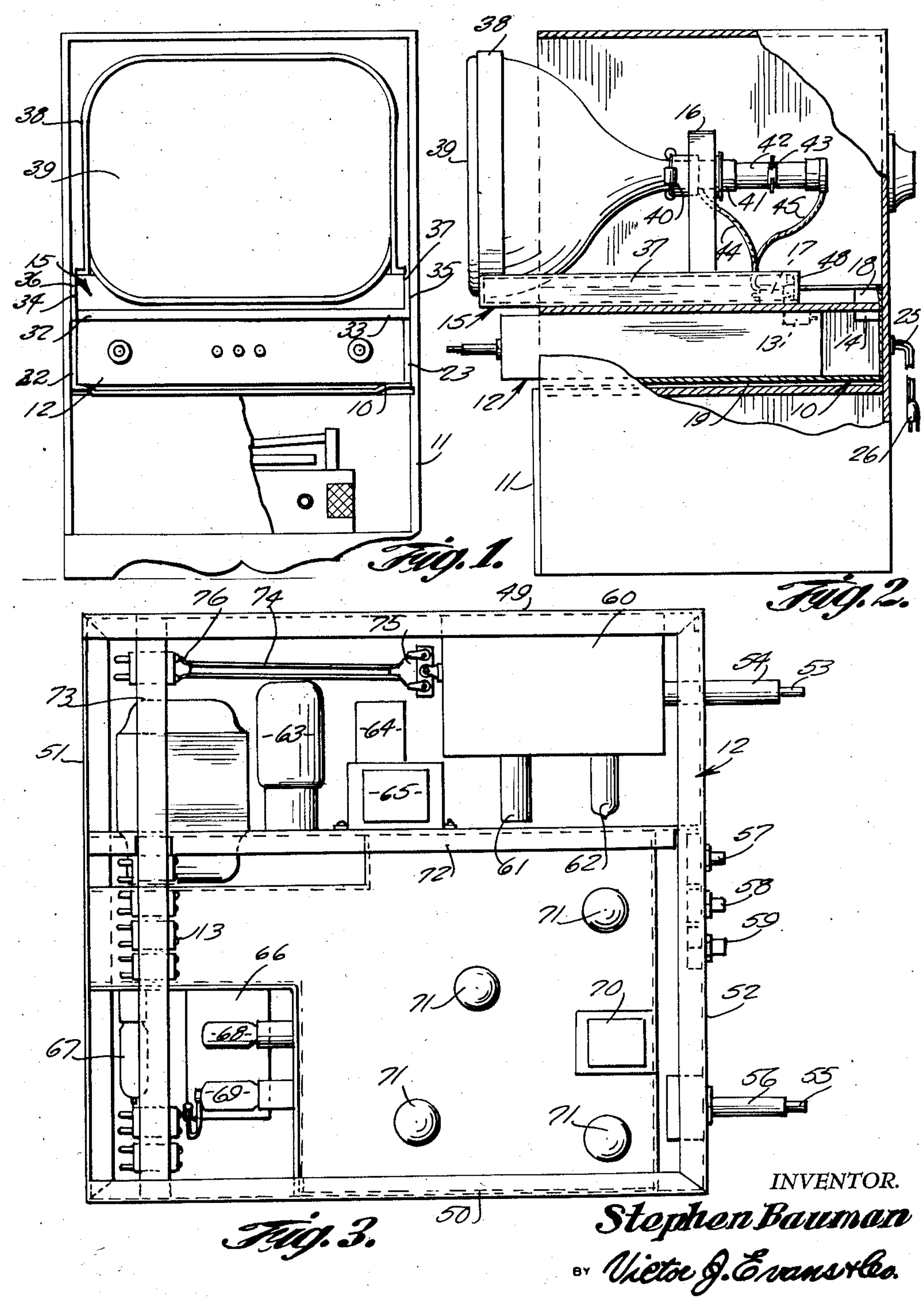
Figure 1 is a front elevational view of the improved television cabinet.
Figure 2 is a side elevational view of the cabinet shown in Fig. 1 with parts broken away showing a picture tube mounting tray and a chassis tray both of which are partly withdrawn from the cabinet.
Figure 3 is a plan view of the tray including the component parts of the chassis of the set with the tray and parts shown on an enlarged scale.
Figure 4:
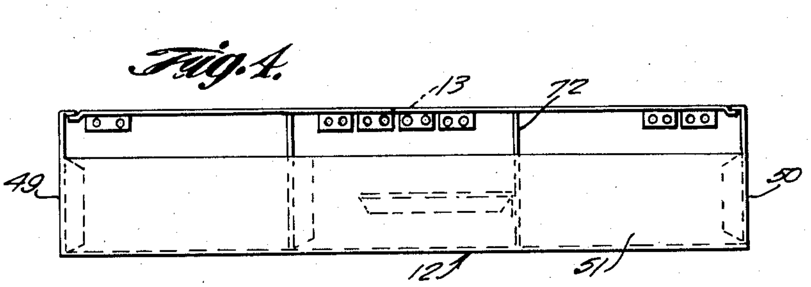
Figure 4 is an end elevational view of the chassis mounting tray looking toward the inner end of the tray and with the parts shown on an enlarged scale.
Figure 5:
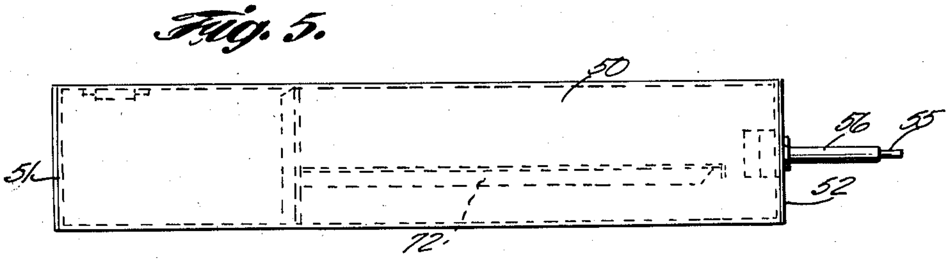
Figure 5 is a side elevational view of the tray shown in Fig. 4 also with the parts shown on an enlarged scale.

Referring now to the drawings wherein like reference characters denote corresponding parts the improved television cabinet of this invention includes a stationary mounting frame 10 adapted to be secured, such as by bolts, in a cabinet 11, a chassis mounting tray 12 slidably mounted in the lower part of the frame 10 and having plugs 13 adapted to engage and coact with jacks 14 of the frame 10 and a picture tube carrying tray 15 having a picture tube mounting partition 16 extended upwardly therefrom and having plugs 17 adapted to engage and coact with jacks 18 of the mounting frame 10.

Figures 6, 7:
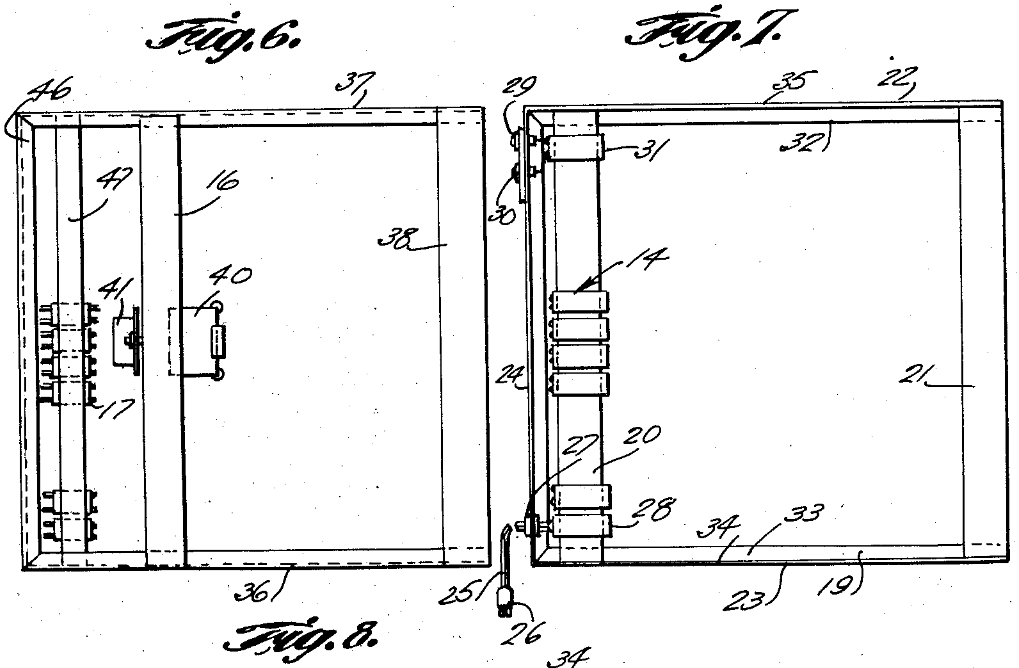
Figure 6 is a plan view of the picture tube mounting tray showing the picture tube mounting elements with the picture tube omitted.
Figure 7 is a view looking upwardly showing the under surface of a stationary mounting frame adapted to be permanently installed in a television cabinet and in which the chassis and picture tube carrying trays are slidably mounted.
Figure 8:
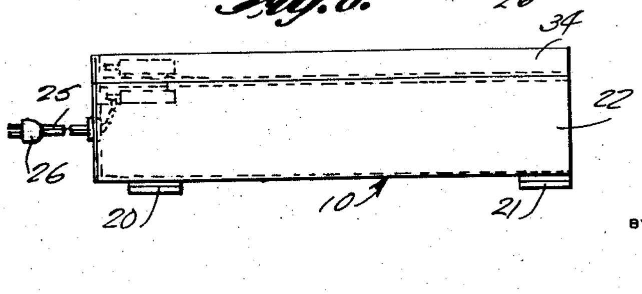
Figure 8 is a side elevational view of the mounting tray shown in Fig. 7.

The mounting frame 10, which is secured by bolts, or other fastening elements in the cabinet 11 is provided with a base 19 upon which transversely disposed bars 20 and 21 are secured and, as illustrated in Figs. 7 and 8 side walls 22 and 23, channel-shaped in cross section extend upwardly from the base and a similarly shaped wall 24 extends across one end. An electric supply cord 25 having a plug 26 on the extended end extends through an eyelet 27 in the end wall 24 and is connected to a jack 28 in the upper part of the frame. A similar connection including eyelets 29 and 30 is provided at the opposite side of the frame for an antenna connection, the eyelets being connected by suitable wires to a jack 31.

The chassis carrying tray 12 is slidably mounted in the lower part of the frame 10 with plugs 13 thereof adapted to coact with and engage the jacks 14 of the mounting frame with the tray 12 in operative position in the frame 10. The upper part of the frame 10 is provided with rails 32 and 33 with flanges 34 and 35 extended upwardly from the rails to provide tracks or guides for the picture tube carrying tray 15 the plugs 13 of which are positioned to coact with the jacks 18 of the mounting frame with the tray 15 in the operative position in the mounting frame.

The picture tube carrying tray 15 is also provided with side walls 36 and 37 which are positioned to slide in the guides or flanges 34 and 35 and a bracket 38 for supporting the large end of the tube 39 extends upwardly from the side walls. The partition 16 is provided with means for supporting the deflection yoke 40 in one side and the focusing magnet assembly 41 in the opposite side. The section 42 of the tube is provided with an ion trap 43. The tube is connected with wires 44 and 45 to the plugs 17. The inner ends of the side walls 36 and 37 are connected with a wall 46 and a bar 47 is provided for supporting the plugs 17.

The picture tube tray 15 is, therefore, slidably mounted between the flanges or guides 34 and 35 and upon the rails 32 and 33 and to repair the tube or parts thereof is only necessary to withdraw the tube and tray, as illustrated in Fig. 2, and after making the repair the tray with the tube thereon is reinserted in the cabinet and mounting frame with the plugs 17 engaging the jacks 18 of the mounting frame.

The lower portion of the inner wall 48 of the tray 15 is omitted to provide an opening for receiving the jacks 18.

The tray 12 also includes side walls 49 and 50, an inner wall 51 and an outer or front wall 52 and, as illustrated in Fig. 3 the control devices extend through the front wall 52 with a channel selector 53 extended through a tubular fine tuning shaft 54 and an on and off and volume control shaft 55 extended through a brightness control tube 56. The wall 52 is also provided with synchronizing controls and the like as indicated by the numerals 57, 58 and 59.

Although the component parts with the wiring or circuits thereto are not shown in detail in the tray in Fig. 3 the device is illustrated as having a tuner 60 with tubes 61 and 62 at one side thereof, rectifier tubes 63, a filter condenser 64, a filter choke 65, a high voltage transformer 66, horizontal deflecting tubes 67, 68 and 69, a vertical output transformer 70 and various tubes and control devices as indicated by the numeral 71. The side and end walls of the tray 12 are channel-shaped in cross section and the upper portion of the wall 51 is omitted to provide access for the jacks as the tray is forced inwardly to the operative position. The tray may also be provided with an intermediate partition 72 and a bar 73 upon which the plugs 13 are mounted. The tuner 60 is connected to the antenna jack 31 with a shaft 74 having universal joints 75 and 76 at the ends thereof.

The component parts of the television set or chassis thereof as incorporated in the tray 12 are conventional and the parts are adapted to be connected with suitable circuits.

*Operation*

With the parts designed and assembled as illustrated and described the cabinet will have the appearance of a conventional television cabinet and as long as the set operates satisfactorily the parts remain in position in the cabinet. However, should trouble develop in the set it is only necessary to withdraw the tray 12 to examine the tubes, condensers, filters, resistors and other parts of the circuit and should the parts of the chassis be found satisfactory the tube may be withdrawn to examine the connections and mountings thereof. When the trouble has been located and the parts repaired the trays are reinserted in the cabinet or in the intermediate frame thereof and with the parts in position the set is adapted to be operated.

The cabinet is provided with conventional sound reproducing and amplifying means and the cabinet may be used in combination with record playing and making instrumentalities, as shown in the lower right hand corner of Fig. 1.

It will be understood that modifications, within the scope of the appended claim, may be made in the design and arrangement of the parts without departing from the spirit of the invention.

What is claimed is:

A television receiver comprising a cabinet, a horizontally disposed mounting frame permanently mounted in the cabinet, said frame including a base, transversely disposed bars mounted on said base adjacent the ends thereof, channel-shaped side walls secured to said base longitudinally thereof, a channel-shaped end wall extending transversely of said base adjacent one end thereof, a plurality of upper and lower jacks mounted on said transversely disposed bars, a tray including the component parts of a television receiver slidably mounted in the channel-shaped side walls of the frame, said tray including a vertically disposed intermediate partition and a horizontally disposed bar at right angles to said partition having plugs thereon positioned to coact with the lower jacks on the transversely disposed bars, parallel channel-shaped rails mounted in the frame above said base, a picture tube carrying tray slidably mounted in the rails in the frame, a mounting partition for the picture tube mounted on the tube carrying tray in vertical relation thereto, an opening in said tube carrying tray, plugs carried by the picture tube carrying tray and positioned adjacent the opening in said tube carrying tray to permit the plugs to coact with the upper jacks on the transversely disposed bars of the frame for completing circuits to the tube, and means for connecting circuits of the parts of the receiver and picture tube to power supplying means and also to sound reproducing and amplifying means.

References Cited in the file of this patent

UNITED STATES PATENTS

| | | |
|---|---|---|
| 2,413,922 | Jensen | Jan. 7, 1947 |
| 2,486,764 | Singer | Nov. 1, 1949 |
| 2,514,246 | Knox | July 4, 1950 |
| 2,543,146 | Bace | Feb. 27, 1951 |
| 2,602,842 | Morris et al. | July 8, 1952 |
| 2,789,024 | Heisler | Apr. 16, 1957 |